(12) United States Patent
Oles

(10) Patent No.: US 8,169,660 B2
(45) Date of Patent: May 1, 2012

(54) SYSTEM AND METHOD FOR MULTIPLE PRINTER CALIBRATION USING EMBEDDED IMAGE CALIBRATION DATA

(75) Inventor: David J. Oles, San Marcos, TX (US)

(73) Assignee: DNP IMS America Corporation, Concord, NC (US)

( * ) Notice: Subject to any disclaimer, the term of this patent is extended or adjusted under 35 U.S.C. 154(b) by 833 days.

(21) Appl. No.: 12/286,831

(22) Filed: Oct. 2, 2008

(65) Prior Publication Data

US 2009/0086234 A1    Apr. 2, 2009

Related U.S. Application Data

(60) Provisional application No. 60/997,304, filed on Oct. 2, 2007.

(51) Int. Cl.
*G06F 1/00* (2006.01)
*H04N 1/40* (2006.01)

(52) U.S. Cl. .......... 358/1.9; 358/504; 358/523; 358/518

(58) Field of Classification Search .................... 358/1.9, 358/504, 523, 518
See application file for complete search history.

(56) References Cited

U.S. PATENT DOCUMENTS

| | | | |
|---|---|---|---|
| 5,806,081 A | 9/1998 | Swen et al. | |
| 6,334,721 B1 | 1/2002 | Horigane | |
| 6,404,511 B1 * | 6/2002 | Lin et al. | 358/1.9 |
| 7,069,164 B2 | 6/2006 | Viturro et al. | |
| 2002/0140985 A1 | 10/2002 | Hudson | |

* cited by examiner

*Primary Examiner* — Houshang Safaipour
(74) *Attorney, Agent, or Firm* — Matthew J. Booth & Associates, PLLC; Matthew J. Booth

(57) ABSTRACT

Disclosed is a system and method for calibrating multiple printers, and particularly color printers, in a networked environment using data embedded in select color patches in target sheets generated by each printer, which embedded data allows automated processing of the target sheets and association of appropriate target sheet data with the correct printer. The embedded data preferably includes an identification of which of multiple printers a particular target sheet corresponds to, along with data about the target sheet itself.

15 Claims, 3 Drawing Sheets

SYSTEM AND METHOD FOR MULTIPLE PRINTER CALIBRATION USING EMBEDDED IMAGE CALIBRATION DATA

CROSS REFERENCE TO RELATED APPLICATIONS

This application is based upon and gains priority from U.S. Provisional Patent Application Ser. No. 60/997,304, entitled "Embedded Image Calibration Data", filed with the U.S. Patent and Trademark Office on Oct. 2, 2007 by the inventor herein, the specification of which is incorporated herein by reference.

FIELD OF THE INVENTION

This invention relates to printer calibration, and more particularly to the management of color target sheets of multiple color printers used for calibrating multiple printers.

DESCRIPTION OF THE BACKGROUND

Digital printing technology, such as dye sublimation or ink jet, is rapidly replacing conventional silver halide (AgX) printing technology in the marketplace. Modern retail AgX photolabs, often referred to as a "digital minilab" or DML, use a digital exposure engine, one or more rolls of photographic paper and a chemical processing unit. Digital images are transferred to the photo paper using the exposure engine. Prints can be made in a variety of sizes depending upon the size of roll loaded in the minilab as well as the capabilities of the digital exposure unit. Exposed photographic paper is transferred to a chemical processing unit from which finished pictures emerge after approximately 5 minutes. Modern minilab systems enjoy benefits such as speed and inexpensive consumables, but are relatively expensive to purchase and use hazardous chemicals.

Digital printing technology, such as dye sublimation printers, have a smaller physical footprint, use no hazardous chemistry and are significantly less expensive than digital minilabs. Digital printing technology typically has a higher operating cost (consumables) which is offset by the lower purchase print and service fees. To achieve comparable printing speeds to digital minilabs, multiple printers can be used simultaneously. As an example, three dye sublimation printers that are each capable of printing 500 unique prints per hour can be combined to produce 1,500 prints per hour. In order to fully benefit from this speed potential, consumer print orders that usually consist of 27 or more prints per order must be spread across the number of printers that are available.

One challenge caused by using multiple printers is calibration. In general, digital printers are manufactured and factory calibrated to a set standard. However, some unit to unit variation does exist. This variation may grow as printing units age. Color management technology, such as ICC (International Color Consortium), is often used to calibrate each individual printer to a set standard. Printers can be calibrated (or profiled) as needed or on a periodic basis to ensure consistency. Printer profiles are created by printing specific color target sheets (i.e., printed sheets having a known pattern of colored patches), reading the target sheets using a spectrophotometer, and processing the results using specialized software to determine the variance of the printed colored patches on the target sheets from the intended target pattern, and to establish a printer calibration profile adjusting the print settings to match the intended target pattern. The number of colored patches that must be printed to create a calibration profile for each printer varies based upon the desired accuracy of the calibration profile and the size of the paper used to print the target sheets. As an example, 5-4×6 target sheets must be produced to create a calibration profile using 729 colored patches on the target sheets. An example of a target sheet formed of colored patches of typical configuration is shown in FIG. 1. While FIG. 1 depicts a target sheet having individual patches shown in varying shades of gray, those of ordinary skill in the art will recognize that in a typical target sheet, such individual patches are in fact color patches of varying colors to properly allow for color calibration across a wide spectrum of colors.

When using multiple printers, it is typically desirable to ensure that each printer prints images as nearly identical to one another as possible. For instance, because many photo customers desire multiple photo prints in their order, it is important to ensure that an order that has been routed to multiple printers for faster processing is printed such that the same image printed on two different printers looks identical in each print. Regular calibration of the printers is important to ensure that such separate printers maintain the ability to print the same image in as much of identical form as possible. Photo print labs will thus typically have a policy governing frequency of printer calibration. To perform such calibration, a computer at the lab typically runs an application which lets the lab operator print target sheets from specifically selected printers. Those target sheets typically include human readable text and/or labels on each page indicating, for instance, "Sheet X of Y" (i.e., the number X of the current sheet in a collection of Y target sheets for the specific printer undergoing calibration). Once those sheets are printed, the application typically allows the operator to perform a calibration function for a specifically selected printer, in which case the application instructs the user to scan specific target sheets for that selected printer using a spectrophotometer. The user must closely follow the instructions, feeding the specifically instructed sheet into the spectrophotometer at the designated time, in order for the software to generate the appropriate printing profile for the designated printer. After the required target sheets for the designated printer are fed through the spectrophotometer, the software gives the user various options to configure the print profile, and to associate that profile with one or more individual printers.

Because it is becoming common for multiple printers of the same size to be used in digital photo labs, a lab operator may thus need to handle between 15 and 20 printed pages when re-calibrating a system. These pages must be kept and processed in the correct order to build calibration profiles. While the process of calibrating a single printer may be complicated and time consuming, the process of calibrating multiple printers thus adds a level of complexity for the lab operator, requiring them to manage and maintain in proper order multiple target sheets from multiple printers to ensure that each target sheet being processed is recognized as having been generated by the specific printer for which a profile is to be generated. A method to simplify this calibration process is thus highly desirable.

SUMMARY OF THE INVENTION

Disclosed is a system and method for calibrating multiple printers, and particularly color printers, in a in a networked environment using data embedded in select color patches in target sheets generated by each printer, which embedded data allows automated processing of the target sheets and association of appropriate target sheet data with the correct printer. The embedded data preferably includes an identification of which of multiple printers a particular target sheet corresponds to, along with data about the target sheet itself.

With regard to a first aspect of a particularly preferred embodiment, the invention comprises a method for calibrating multiple printers in a networked environment, multiple printers are caused to generate a printed target sheet comprising a plurality of colored patches, the printed target sheets from each of the printers are scanned to obtain measured reflectance values of the colored patches, the scanned target sheets are associated with a specific one of the multiple printers based upon data embedded in the color patches, and separate calibration profiles are created for each printer using the data embedded in the color patches to determine a destination printer for each calibration profile.

With regard to another aspect of a particularly preferred embodiment, the invention comprises a system for calibrating multiple printers in a networked environment, the system comprising a plurality of printers, a scanner, and a calibration system in data communication with the printers and the scanner, the calibration system having executable computer instructions to cause each of the printers to generate a printed target sheet comprising a plurality of colored patches, receive from the scanner measured reflectance values of the colored patches resulting from scanning the printed target sheets from each of the printers, associate each scanned target sheet with a specific one of the plurality of printers based upon data embedded in the color patches, and create separate calibration profiles for each printer using the data embedded in the color patches to determine a destination printer for each calibration profile.

With regard to yet another aspect of a particularly preferred embodiment, the invention comprises a computer-readable storage medium comprising executable computer instructions to cause multiple printers in data communication with the computer-readable storage medium to generate a printed target sheet comprising a plurality of colored patches, receive from a scanner in data communication with the computer-readable storage medium measured reflectance values of the colored patches resulting from scanning the printed target sheets from each of the printers, associate each scanned target sheet with a specific one of the plurality of printers based upon data embedded in the color patches, and create separate calibration profiles for each printer using the data embedded in the color patches to determine a destination printer for each calibration profile.

DETAILED DESCRIPTION OF THE PREFERRED EMBODIMENT

Figure 1:
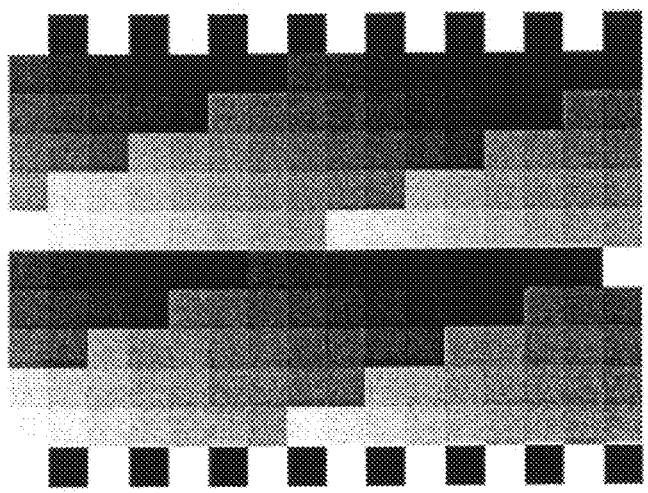
FIG. 1 is an exemplary prior art target sheet comprised of multiple color patches.

The invention summarized above may be better understood by referring to the following description, which should be read in conjunction with the accompanying drawings in which like reference numbers are used for like parts. This description of an embodiment, set out below to enable one to practice an implementation of the invention, is not intended to limit the preferred embodiment, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

According to a first aspect of a particularly preferred embodiment of the invention, specifically designated color patches in a portion of the target sheet (i.e., individual color patches located at a specifically predesignated location within a target sheet) on a target sheet may be used to provide data about the target sheet and/or the printer from which such target sheet was generated. This data is provided to the host application implementing a printer calibration system to simplify the calibration process by allowing the software to automatically track which target sheets are associated with which printers, thus allowing the lab operator to scan the target sheets using, for example, a spectrophotometer, in any order without the risk of improperly associating a target sheet with an incorrect printer. In order to allow color patches on a target sheet to function as data elements, a lookup table embodying a numbering system may be used to associate specific numeric values to different colors. An exemplary number/color scheme using the octal-based number system is shown below in Table 1:

| Color | Octal Number |
| --- | --- |
| White | 0 |
| Black | 1 |
| Red | 2 |
| Green | 3 |
| Blue | 4 |
| Cyan | 5 |
| Magenta | 6 |
| Yellow | 7 |

Those of ordinary skill in the art will recognize that additional colors could be added to instead use a decimal, hexadecimal, or other number system without departing from the spirit and scope of the instant invention. By increasing the number of colors used in such system, one may reduce the number of target sheets required to represent each set of data (for example, using a system with at least 31 colors would allow the day of the month to be represented by one square). However, the octal number system is currently preferred, because it ensures that there is sufficient variance in color between different values (i.e., between different color boxes on the target sheet) that can be detected, particularly given that the application is attempting to distinguish such values/colors in an uncalibrated environment). Using only 8 numbers allows for greater variance in colors than if 10 numbers were used; the precise number of colors used (and thus numbering system used) may be adapted to the particular circumstances of each installation.

Many data elements may be embedded in each printed target sheet, including: the date (month, day, and year) on which the target sheet was printed; a timestamp (providing more granular tracking of the age of target sheets) indicating the time at which the target sheet was printed; the number of target sheet prints comprising the current data set and the number of the current target sheet print; the printer model number and/or device code; the printer sequence number; revision information for the target sheets; a target code to tell the calibration system application in what order the color patches comprising data squares are coming (e.g., in cases where it is desired to break up the data into multiple target sheets in order to increase the amount of raw color data included in the target sheet, the target code may indicate that such raw color data actually starts at line X on the current target sheet or another target sheet, or may be used to indicate the total size of/number of color patches making up the raw color data, so that the application knows how much total raw color data applies to the specific label indicated in the embedded data); and a code allowing the application to link multiple pages together (e.g., indicating that the next target page is part of the current target sheet sequence, even though the next page is not provided with the embedded information), thus allowing in some situations elimination of the additional embedded data on at least some of the target sheets undergoing processing.

Figure 2:
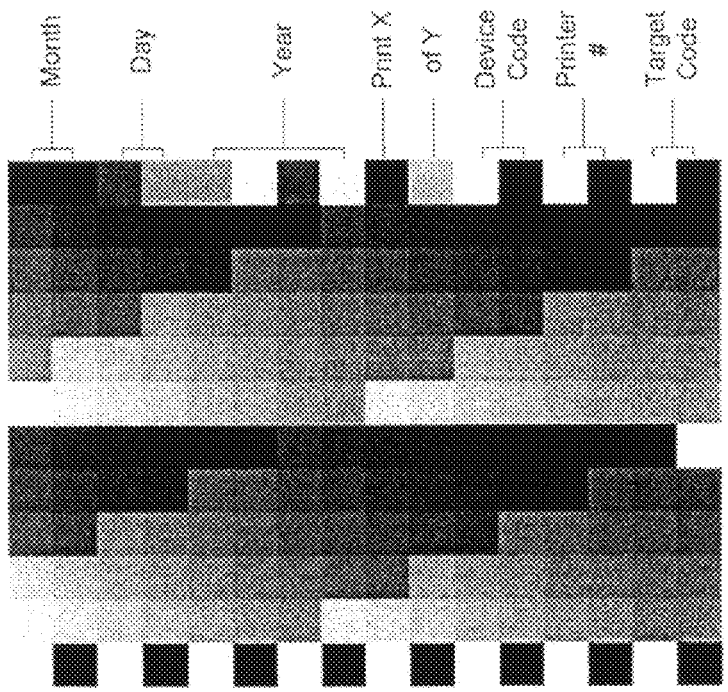
FIG. 2 is an exemplary target sheet according to a first aspect of a particularly preferred embodiment of the invention.

An example of a target sheet with such embedded data is shown in FIG. 2 depicting the date on which the target sheet was generated (month, day, and year), the number for the current target sheet print and number of total target sheet prints, the device code, the printer number, and the target code.

More or fewer color patches may be used to store embedded information than that shown in FIG. 2, and some patches may indicate values in a first number scheme, such as octal, while others may indicate values in one or more other number schemes, such as decimal. Such encoding may be varied in a single line of embedded data as long as the calibration system application is informed of which type of number scheme is used at each color square location. Also, it is envisaged that the embedded data need not be positioned in the first row of the target sheet, and that it may be moved to another location as circumstances may require. For instance, if the first row of squares is used to provide a machine-recognizable header, the embedded data may easily be moved simply to an adjacent line or any other location in the target sheet, so long as the calibration system application is able to isolate and analyze that particular location.

By using portions of the target sheet as data elements identifying the target sheet, and more particularly the source and time of creation of such target sheet, the lab operator can process target sheets in any order, as the host application can automatically identify the targets, sequence the targets in the correct order, and apply the newly created calibration profile for the correct printer.

Target sheets that have aged beyond a predetermined amount of time may no longer reflect the actual current conditions of the printer from which they were generated. Thus, if a target sheet shows a calibration profile that has aged beyond a predetermined amount of time, the application may automatically reject that target sheet in order to prevent inaccurate profiles from being generated.

Figure 3:
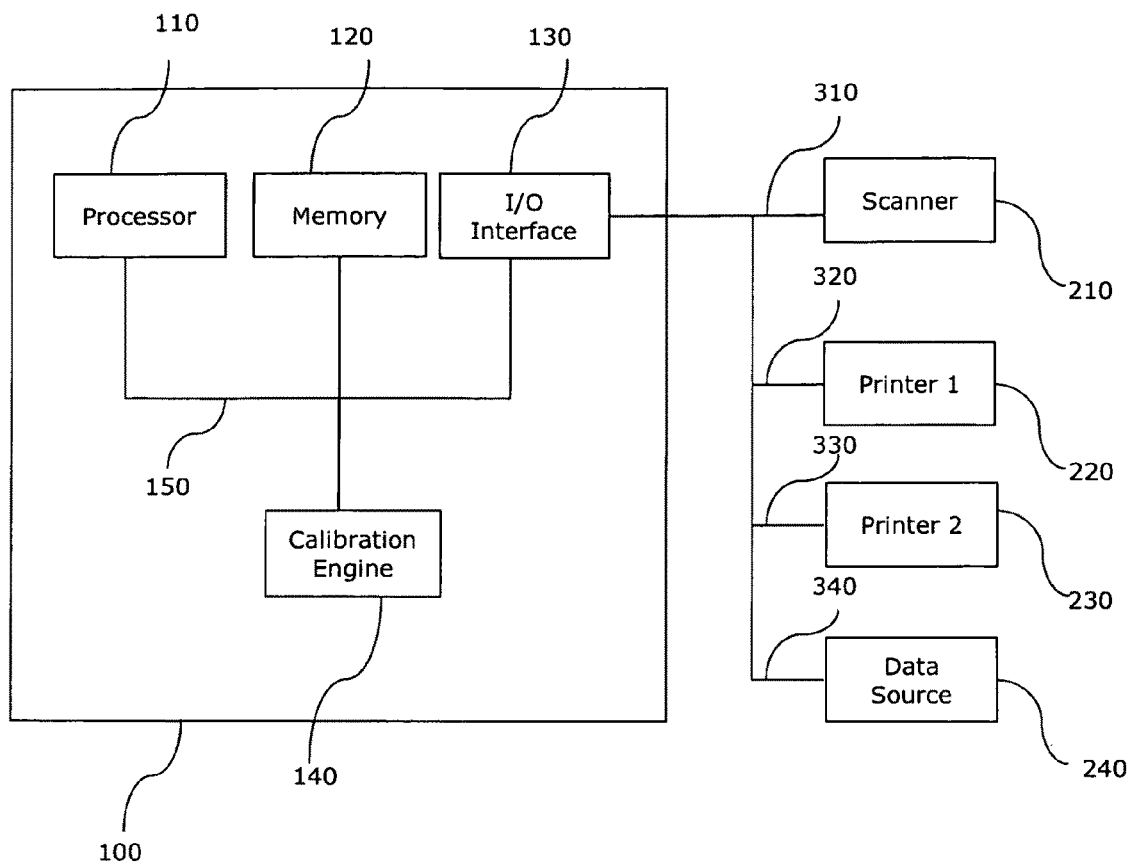
FIG. 3 is a functional block diagram illustrating an exemplary calibration system according to another aspect of a particularly preferred embodiment of the invention.

FIG. 3 shows a functional block diagram of an exemplary calibration system 100 according to another aspect of a particularly preferred embodiment of the invention. Calibration system 100 is preferably in data communication with a target sheet scanning device 210 capable of quantifying the characteristics of color patches on a target sheet for comparison with desired values to determine the extent to which settings on a printer attached to calibration system 100 must be modified for proper calibration. Target sheet scanning device 210 may comprise, for example, a scanner, and more particularly a spectrophotometer, which obtains reflectance values from color patches on a target sheet, such as the exemplary target sheet of FIG. 2. Target sheet scanning device 210 is preferably connected to calibration system 100 through a link 310, which link 310 may be any known or later developed system or device for transmitting the data from target sheet scanning device 210 to calibration system 100, and may comprise, for example, a wired connection, a wireless connection, or an optical link to a network, such as a local area network, a wide are network, an intranet, the Internet, or any other distributed processing and storage network.

Also connected to calibration system 100 is a plurality of image output devices 220 and 230, such as (by way of non-limiting example) multiple dye sublimation printers configured for printing photographs to fulfill a customer's photograph order. As with target sheet scanning device 210, image output devices 220 and 230 may be connected to calibration system 100 through links 320 and 330, respectively, which links 320 and 330 may be any known or later developed system or device for transmitting the data between image output devices 220 and 230 and calibration system 100, and may comprise, for example, a wired connection, a wireless connection, or an optical link to a network, such as a local area network, a wide are network, an intranet, the Internet, or any other distributed processing and storage network.

While only two image output devices are shown for purposes of simplified illustration in FIG. 3, those of ordinary skill in the art will recognize that any larger number of image output devices may likewise be connected to calibration system 100 without departing from the spirit and scope of the invention.

Also preferably connected to calibration system 100 is a data source 240 for receiving image data from, for example, a customer wishing to have a photo order fulfilled. Data source 240 may thus comprise a digital camera, a scanner, a locally or remotely located computer, a portable memory device, or any other known or later developed device that is capable of generating, storing, transmitting, and/or supplying electronic image or text data. As with target sheet scanning device 210 and image output devices 220 and 230, data source 240 may be connected to calibration system 100 through link 340, which link 340 may be any known or later developed system or device for transmitting the data between data source 240 and calibration system 100, and may comprise, for example, a wired connection, a wireless connection, or an optical link to a network, such as a local area network, a wide are network, an intranet, the Internet, or any other distributed processing and storage network.

Calibration system 100 may include a computer processor 110, memory 120, input/output interface 130, and a calibration engine 140, which elements are preferably interconnected by data/control bus 150. Processor 110 controls the operation of other components of calibration system 100 as necessary, performs any required calculations, and executes any programs necessary for implementing the processes of calibration system 100 and its individual components, and controls the flow of data between components. Memory 120 serves as a buffer for information coming into or going out of calibration system 100, and may store data at various stages of processing. Likewise, while memory 120 is depicted in FIG. 3 as a single element, those of ordinary skill in the art will recognize that memory 120 may likewise be distributed, with modifiable portions of memory 120 preferably being implemented using static or dynamic RAM, writeable magnetic or optical disks and disk drives, a computer hard drive, flash memory, or other similarly configured memory devices. Static portions of memory 120 may be implemented using ROM or other non-volatile memory, including PROM, EPROM, EEPROM, or optical disk ROM such CD-ROM or DVD-ROM, in addition to magnetic or optical disks and disk drives, flash memory, or other modifiable memory as described above.

Calibration engine 140 preferably manages the generation of calibration target sheet pattern files for each printer attached to calibration system 100. Such calibration target sheet pattern files are unique to each printer, as they include the embedded data discussed above which identify a specific target sheet (through particular colors corresponding to particular numeric data values being assigned to particular color patch locations in the target sheet as described above) as having been generated by a particular output device (e.g., printers 220 and 230). Calibration engine 140 likewise preferably receives data from scanner 210, determines (through analysis of the designated color patches containing the embedded data) which output device generated the subject target sheet, and generates a new calibration profile for each output device, including printer-specific adjustments to output settings, such as print settings, to minimize the variance from desired values for the color patches in each target sheet. For instance, scanner 210 may measure the reflectance spectra of each color patch on each target sheet generated by printers 220 and 230, and calibration engine 140 may convert the reflectance spectra to, for example, L*a*b* color space values. Those calculated L*a*b* values may then be compared to desired L*a*b* values which have been determined in advance. Once generated, those new calibration profiles may be transmitted from calibration system 100 to each output device to effect the intended output setting changes.

Figure 4:
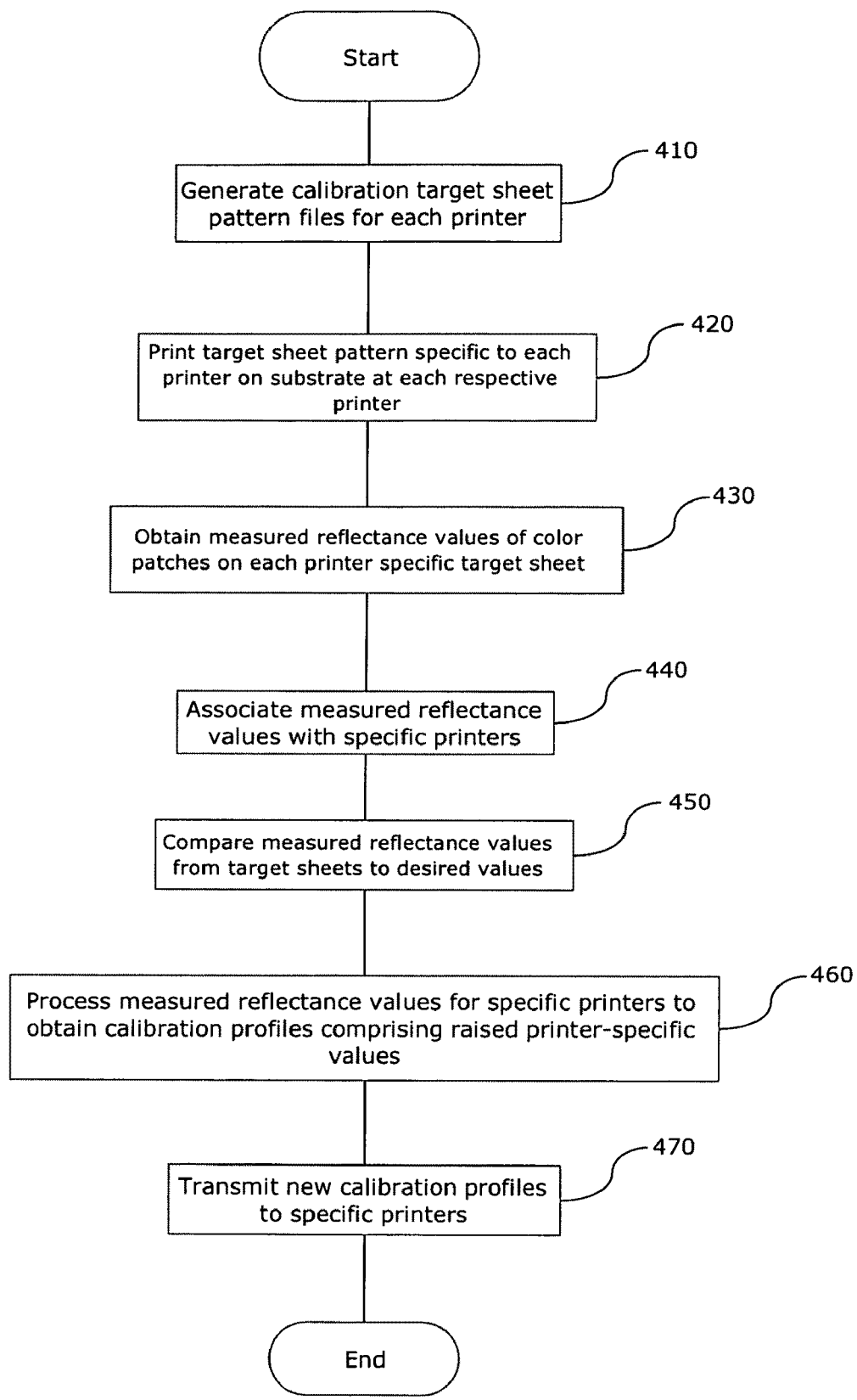
FIG. 4 is a flowchart illustrating an exemplary method of calibrating multiple printers in a network environment using embedded data according to particular aspects of the invention.

FIG. 4 shows a flowchart illustrating an exemplary method of calibrating multiple printers in a network environment using embedded data according to particular aspects of the invention. At step 410, calibration engine 140 generates a calibration target sheet pattern file for each printer based on stored information associating data elements (which data elements may be represented by numeric values) with color patch locations on each target sheet. Step 410 may be carried out at system startup, at intermediate times during operation of calibration system 100, upon some triggering event (such as addition of another output device, such as a printer, to calibration system 100), or at such other intervals as a particular installation's requirements might warrant. At step 420, a target sheet pattern specific to each printer is printed on a substrate at its respective printer to create a printer-specific target sheet for each printer. Those of ordinary skill in the art will recognize that the output devices need not produce target sheet patterns at the same time, and in fact given the processing capabilities of calibration system 100 discussed above (allowing the scanning of target sheet patterns in any order and at any time), may do so at any time without regard to a particularly required order. At step 430, the printer-specific target sheets from step 420 are scanned at scanner 210 to obtain the measured reflectance values of the color patches on each printer-specific target sheet for each printer that was produced at step 420. At step 440, calibration engine 140 associates the measured reflectance values from step 430 with specific printers based upon the reflectance values of specific data element color patch locations on each target sheet. At step 450, calibration engine 140 compares the measured reflectance values from each target sheet to desired values, and at step 460, calibration engine 140 processes the measured reflectance values for specific printers to obtain calibration profiles comprising revised printer-specific values. Last, at step 470, the newly generated calibration profiles are transmitted from calibration system 100 to specific printers, which specific printers are determined from the measured reflectance value of color patches on the printer-specific target sheets for each printer.

The system described above may be implemented on a single program general purpose computer or separate programmed general purpose computers, with an associated scanner 210, such as a spectrophotometer, and a plurality of output devices 220, 230, such as dye sublimation printers. The system and method described above may also be implemented on a special purpose computer, a programmed microprocessor or microcontroller and peripheral integrated circuit element, an ASIC or other integrated circuit, a digital signal processor, a hard-wired electronic or logic circuit such as a discrete element circuit, a programmable logic device such as a PLD, PLA, FPGA, PAL, or the like, or any other device capable of implementing a finite state machine that is in turn capable of implementing the calibration system 100 according to the invention set forth herein.

Further, the methods described above may be implemented in software using object or object-oriented software development environments that provide source code that can be used on various computer or workstation hardware platforms. Alternatively, portions of the calibration system described herein may be partially or fully implemented in hardware using standard logic circuits or a VLSI design. Whether software or hardware is used to implement the foregoing systems depends upon the speed and/or efficiency requirements of the system, the particular function, and the particular software or hardware systems or microprocessor or microcomputer systems being used. The processing systems and methods described above, however, can be readily implemented in hardware or software using any known or later developed systems or structures, devices and/or software by those skilled in the applicable art without undue experimentation from the functional description provided herein together with a general understanding of the computer arts. Further, the disclosed methods may be implemented as software executed on a programmed general purpose computer, a special purpose computer, a microprocessor, or the like. In this case, the methods described herein may be implemented as a routine embedded on a personal computer or as a resource residing on a server or computer workstation, such as a routine embedded in a photocopier, a color photocopier, a printer driver, a scanner, or the like.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It should be understood, therefore, that the invention may be practiced otherwise than as specifically set forth herein.

The invention claimed is:

1. A method for calibrating multiple printers in a networked environment, comprising:
   causing each of said printers to generate a printed target sheet comprising a plurality of colored patches;
   scanning said printed target sheets from each of said printers to obtain measured reflectance values of said colored patches;
   causing a computer processor to associate said measured reflectance values with a specific one of said multiple printers based upon data embedded in said color patches;
   creating separate calibration profiles for each printer using said data embedded in said color patches to determine a destination printer for each calibration profile;

prior to causing each of said printers to generate a printed target sheet, causing said computer processor to generate calibration target sheet pattern files for each printer;
wherein said calibration target sheet pattern files further comprising an embedded data portion associating said target sheet pattern file with a specific one of said printers;
wherein said embedded data portion further comprising color patches whose measured reflectance values match reflectance values in a lookup table, said lookup table associating data values with said reflectance values; and
wherein said data values are selected from the group consisting of: (i) the date on which the target sheet was generated, (ii) the number of the current target sheet, (iii) the total number of target sheets currently generated for said specific one of said printers, and (iv) an identification of said specific one of said printers.

2. The method for calibrating multiple printers in a networked environment of claim 1, said step of creating separate calibration profiles further comprising:
comparing measured reflectance values of scanned colored patches to desired values; and
processing measured reflectance values to obtain printer-specific output adjustments.

3. The method for calibrating multiple printers in a networked environment of claim 1, said embedded data portion further comprising data describing characteristics of said target sheet.

4. The method for calibrating multiple printers in a networked environment of claim 1, wherein at least one of said data values comprises an identification of said specific one of said printers.

5. The method for calibrating multiple printers in a networked environment of claim 1, further comprising:
transmitting new calibration profiles to specific printers based upon a printer identification in said embedded data.

6. A system for calibrating multiple printers in a networked environment comprising:
a plurality of printers;
a scanner; and
a calibration system in data communication with said plurality of printers and said scanner, said calibration system further comprising executable computer instructions to:
cause each of said printers to generate a printed target sheet comprising a plurality of colored patches;
receive from said scanner measured reflectance values of said colored patches resulting from scanning said printed target sheets from each of said printers;
associate said measured reflectance values with a specific one of said plurality of printers based upon data embedded in said color patches;
create separate calibration profiles for each printer using said data embedded in said color patches to determine a destination printer for each calibration profile;
generate calibration target sheet pattern files for each printer
wherein said calibration target sheet pattern files further comprising an embedded data portion associating said target sheet pattern file with a specific one of said printers;
wherein said embedded data portion further comprising color patches whose measured reflectance values match reflectance values in a lookup table, said lookup table associating data values with said reflectance values; and
wherein said data values are selected from the group consisting of: (i) the date on which the target sheet was generated, (ii) the number of the current target sheet, (iii) the total number of target sheets currently generated for said specific one of said printers, and (iv) an identification of said specific one of said printers.

7. The system for calibrating multiple printers in a networked environment of claim 6, wherein creation of said separate calibration profiles further comprises executable computer instructions to:
compare measured reflectance values of scanned colored patches to desired values; and
process measured reflectance values to obtain printer-specific output adjustments.

8. The system for calibrating multiple printers in a networked environment of claim 6, said embedded data portion further comprising data describing characteristics of said target sheet.

9. The system for calibrating multiple printers in a networked environment of claim 6, wherein at least one of said data values comprises an identification of said specific one of said printers.

10. The system for calibrating multiple printers in a networked environment of claim 6, further comprising executable computer instructions to:
transmit new calibration profiles to specific printers based upon a printer identification in said embedded data.

11. A non-transitory program storage device readable by a programmable device that tangibly embodies a program of instructions executable by the programmable device to perform a method for calibrating multiple printers in a networked environment, comprising:
cause multiple printers in data communication with said computer-readable storage medium to generate a printed target sheet comprising a plurality of colored patches;
receive from a scanner in data communication with said computer-readable storage medium measured reflectance values of said colored patches resulting from scanning said printed target sheets from each of said printers;
associate said measured reflectance values with a specific one of said plurality of printers based upon data embedded in said color patches;
create separate calibration profiles for each printer using said data embedded in said color patches to determine a destination printer for each calibration profile;
generate calibration target sheet pattern files for each printer;
wherein said calibration target sheet pattern files further comprising an embedded data portion associating said target sheet pattern file with a specific one of said printers;
wherein said embedded data portion further comprising color patches whose measured reflectance values match reflectance values in a lookup table, said lookup table associating data values with said reflectance values; and
wherein said data values are selected from the group consisting of: (i) the date on which the target sheet was generated, (ii) the number of the current target sheet, (iii) the total number of target sheets currently generated for said specific one of said printers, and (iv) an identification of said specific one of said printers.

12. The program storage device of claim 11, wherein creation of said separate calibration profiles further comprises:
compare measured reflectance values of scanned colored patches to desired values; and
process measured reflectance values to obtain printer-specific output adjustments.

13. The program storage device of claim 11, said embedded data portion further comprising data describing characteristics of said target sheet.

14. The program storage device Of claim 11, wherein at least one of said data values comprises an identification of said specific one of said printers.

15. The program storage device of claim 11, further comprising:
    transmit new calibration profiles to specific printers based upon a printer identification in said embedded data.

* * * * *

UNITED STATES PATENT AND TRADEMARK OFFICE
CERTIFICATE OF CORRECTION

| | | |
|---|---|---|
| PATENT NO. | : 8,169,660 B2 | Page 1 of 1 |
| APPLICATION NO. | : 12/286831 | |
| DATED | : May 1, 2012 | |
| INVENTOR(S) | : David J. Oles | |

It is certified that error appears in the above-identified patent and that said Letters Patent is hereby corrected as shown below:

In column 1, line 26, delete "photolabs," and insert -- photo labs, --, therefor.

In column 6, line 8-9, delete "wide are" and insert -- wide area --, therefor.

In column 6, line 23, delete "wide are" and insert -- wide area --, therefor.

In column 6, line 45, delete "wide are" and insert -- wide area --, therefor.

In column 11, line 4, in claim 14, delete "Of" and insert -- of --, therefor.

Signed and Sealed this
Twenty-sixth Day of June, 2012

David J. Kappos
*Director of the United States Patent and Trademark Office*